United States Patent [19]
Koehler

[11] 3,791,875
[45] Feb. 12, 1974

[54] UNDERWATER WET CELL BATTERY CASE
[76] Inventor: Carlton L. Koehler, P.O. Box 236, Avalon, Calif.
[22] Filed: Aug. 7, 1972
[21] Appl. No.: 278,450

[52] U.S. Cl............... 136/173, 136/181, 206/1
[51] Int. Cl................. H01m 1/04, A45c 11/22
[58] Field of Search.... 136/166, 173, 181; 206/1, 2; 61/70

[56] References Cited
UNITED STATES PATENTS
| | | | |
|---|---|---|---|
| 1,634,284 | 7/1927 | Dunzweiler et al. | 136/166 |
| 2,094,329 | 9/1937 | Mascuch | 136/166 |
| 2,592,209 | 4/1952 | Stamper | 136/166 |

Primary Examiner—Donald L. Walton
Attorney, Agent, or Firm—Fulwider Patton Rieber Lee & Utecht

[57] ABSTRACT

An underwater wet cell battery case for housing a battery to drive an underwater electrical device and including a housing formed with a body defining a battery-receiving cavity and including a cover secured to such body and cooperating therewith to form a watertight seal. A mounting bracket is formed with a belt loop for securement to a scuba diver's belt and includes swivel means connecting the case thereto for pendulum pivoting of such housing to enable a battery to be placed therein and maintained in an upright position irrespective of maneuvers undertaken by the diver.

6 Claims, 4 Drawing Figures

PATENTED FEB 12 1974 3,791,875

UNDERWATER WET CELL BATTERY CASE

BACKGROUND OF THE INVENTION

1. Field of the Invention

The underwater wet cell battery case of present invention relates to a case for housing a wet cell battery to provide economic means for driving underwater electric devices.

2. Description of the Prior Art

Many prior art underwater electric devices have been proposed which include batteries housed in the devices themselves thus making it impractical to employ relatively inexpensive wet cell batteries because of the difficulty in maintaining such devices in an upright position as the devices are manipulated about. Numerous different types of miners battery cases have been proposed for securement to a miner's belt and the like but such cases suffer the shortcomings that they cannot withstand the high pressures incurred in underwater diving and fail to provide a means for maintaining the battery in an upright position when the wearer alters his own position. Applicant is aware of the following U. S. patents on battery cases of this general type:

2,592,209 — Stamper
2,094,329 — Mascuch
2,187,539 — Carbonara
3,166,446 — Hutchison
3,391,029 — Orsino
3,540,929 — Carson

SUMMARY OF THE INVENTION

The underwater wet cell battery case of the present invention is characterized by a housing formed with a battery-receiving cavity and including a cover secured thereto and having water-tight sealing means for sealing such housing against entry of water. The housing is pivotally mounted in pendulum fashion from a belt bracket which includes loop means for receiving a diver's belt. Thus, the battery container may be suspended at the diver's side and a battery contained therein will be maintained in an upright position irrespective of various maneuvers accomplished by the diver.

The objects and advantages of the present invention will become apparent from a consideration of the following detailed description when taken in conjunction with the accompanying drawing.

DESCRIPTION OF THE PREFERRED EMBODIMENT

Figure 1:
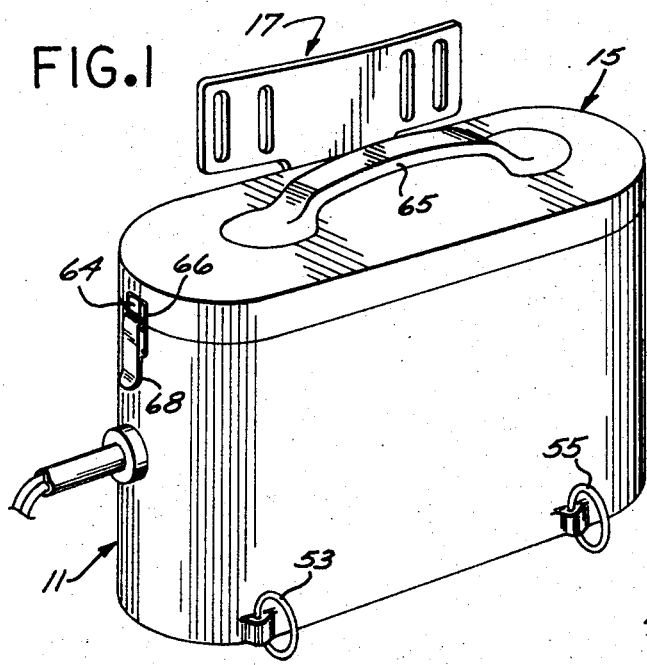
FIG. 1 is a perspective view of an underwater wet cell battery case embodying the present invention.
Figure 4:
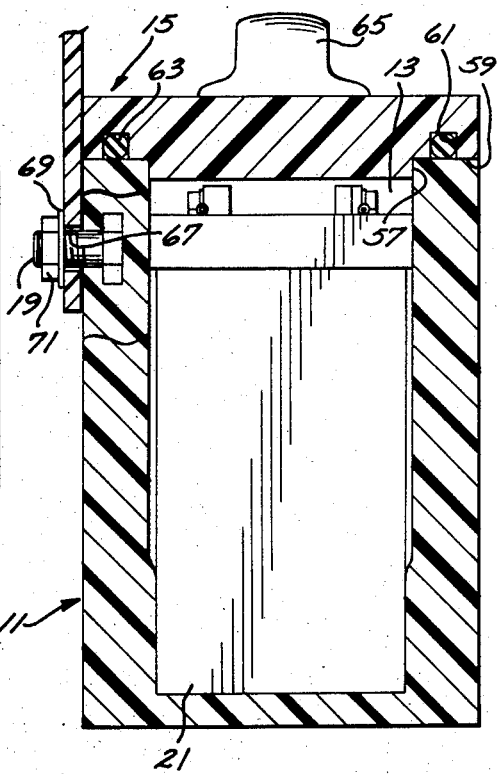
FIG. 4 is a vertical sectional view taken along the line 4—4 of FIG. 3.

Referring to FIGS. 1 and 4, the underwater wet cell battery case of the present invention includes, generally, a housing including a body 11 formed with a battery-receiving cavity 13 and covered by means of a cover 15. The housing body 11 is suspended from a belt bracket, generally designated 17, in pendulum fashion by means of a pivot stud 19 so a battery 21 carried in such housing will be maintained in an upright position irrespective of the orientation taken by the belt bracket 17 as a consequence of various maneuvers accomplished by a diver wearing such bracket from his belt.

Referring to FIG. 4, the housing body 11 and lid 15 may conveniently be made of heavy-duty plastic with the interior cavity being of sufficient size to receive a conventional motorcycle battery having dimensions of 5 ½ inches in height, 2 ⅝ inches deep, and 7 ½ inches long.

Figure 3:
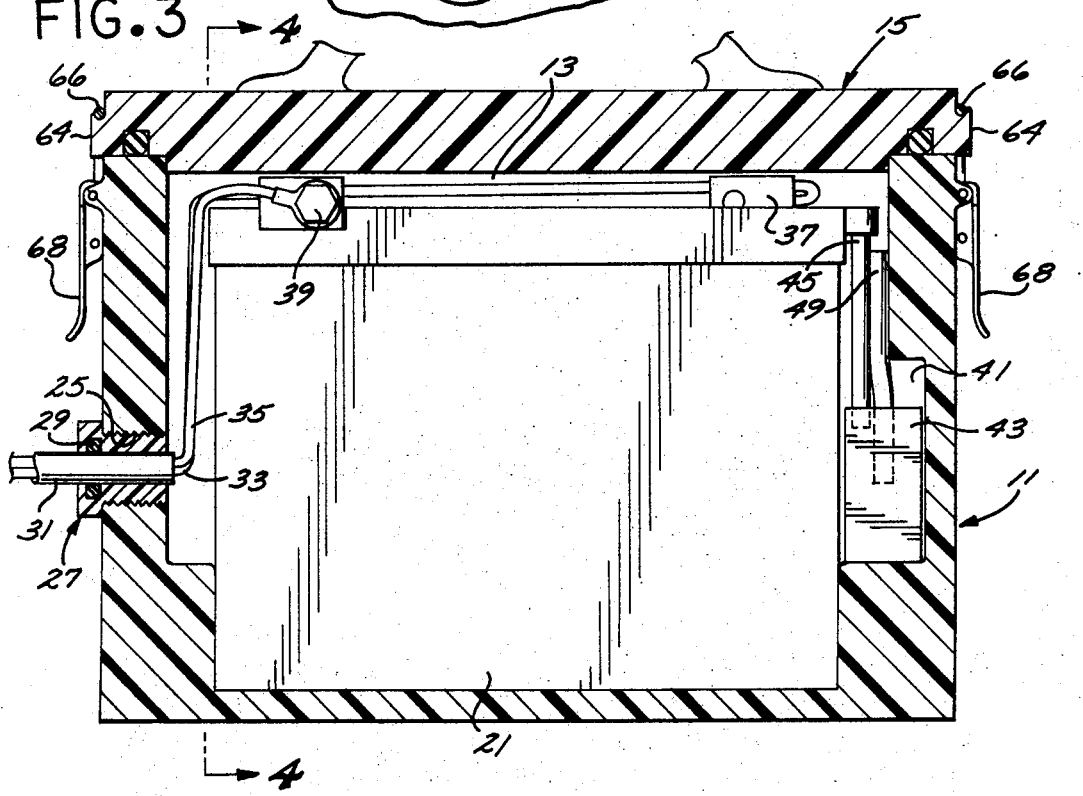
FIG. 3 is a longitudinal sectional view, in enlarged scale, taken through the battery case shown in FIG. 1.

Referring to FIG. 3, the housing body 11 has a threaded bore 25 formed in one end thereof with an externally threaded cable fitting, generally designated 27, being received therein and being formed with a through bore having a gland therein for receipt of an O-ring 29 which seals with an electrical cable 31 leading from the interior of such case. The electrical cable 31 includes a pair of electrical leads 33 and 35 which lead to respective positive and negative terminals 37 and 39 of the wet cell battery 21. Still referring to FIG. 3, the housing body 11 is formed interiorly at the end opposite the cable fitting 27 with a deep recess 41 which receives an acid spill flask 43 which has an opening formed in its top wall for receipt of the lower extremity of an acid-gas vent tube leading from the battery 21. Projecting from the top of the flask 43 is a stand pipe 49 for venting of excess gas, such vent pipe 49 projecting downwardly to the central portion of the flask 43 to minimize any spillage resulting from the case being accidentally overturned.

Referring to FIG. 1, a pair of rings 53 and 55 are mounted on the outer wall of the housing body 11 so a light, propulsion device or the like may be hooked thereto for storage when not in use.

Referring to FIGS. 3 and 4, the cover 15 is cut back around its periphery to form a plug portion 57 which is closely received within the opening defined by the top end of the cavity 13 to thus provide support against implosion of the side walls of the housing body 11. The cut back portion forms a peripheral downwardly facing shoulder 59 which has a downwardly opening groove 61 cut therearound for receipt of a sealing O-ring 63 which seals against the top edge of the side walls of the body 11. The cover 15 includes a handle 65 whereby the case may be carried by hand when detached from the diver's belt.

The opposite ends of the cover 15 are formed with projecting lugs 64 which have the respective bales 66 of respective buckles 68 securable thereover, such buckles 68 being mounted at the opposite ends of the housing body 11.

Referring to FIG. 4, the head of the pivot stud 19 is embedded in the back wall of the housing body 11 and the shank thereof projects outwardly through a bore 67 formed in the lower extremity of the belt bracket 17, a washer 69 being fitted over the projecting end of such stud and a nut 71 being screwed into such end.

Figure 2:
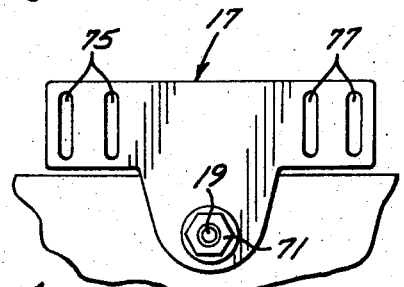
FIG. 2 is a detailed view, in enlarged scale, of a belt bracket included in the battery case shown in FIG. 1.

Referring to FIGS. 1 and 2, the belt bracket 17 is arcuately shaped to accommodate the hip of the wearer and is formed with an elongated belt portion having two pairs of relatively closed spaced slits 75 and 77 formed in the opposite extremities thereof for receipt of the diver's belt.

In operation, the buckles 68 may be released and the cover 15 removed from the housing body 11 to enable a motorcycle battery 21 to be installed within the cavity 13 with the acid and gas vent tube 45 being received in the spill flask 43. The leads 33 and 35 are then connected with the respective positive and negative terminals 37 and 39 of the battery 21 and the cover 15 then placed in position. The buckle bales 66 are then fitted over the respective lugs 64 and the buckles 68 snap closed to secure the cover 15 in its closed position to cause the O-ring 63 to form a water-tight seal between such cover and the top edge of the side walls of the housing body 11.

The diver's belt may then be threaded in one direction through the end slit 75 and back in the opposite direction through the second slit 75 and then returned back through in the one direction through slit 77 and back in through the opposite direction in the end slit 77 to thus cause the belt to bind the bracket 17 securely in position at the diver's hip to prevent slippage of the bracket 17 around such belt.

The cable 31 leading from the cable fitting 27 may then be connected with an underwater electronic device, such as the motor of a propulsion device or an underwater lamp. The diver may then go about his task with his hands being free to maneuver the battery powered underwater device and as he descends in a body of water, the pressure built up about the walls of the housing body 11 and tending to collapse the side and end walls thereof inwardly will be resisted by means of the cover plug portion 57 which blocks the upper extremities of such side and end walls against collapsing inwardly.

As the diver maneuvers about to accomplish different tasks and alters his orientation from vertical to horizontal and even to an inverted orientation, the battery case will be free to pivot about the pivot stud 19 to maintain such battery generally upright thus preventing excess spillage of acid from the overflow tube 45 and keeping the plates covered with electrolyte. However, any current disturbing the position of such battery case or bumping of such battery case against underwater obstacles which may result in partial inversion thereof will only cause a small amount of acid to escape from the overflow tube 45 and such acid will be collected in the flask 43. Further, any gases vented from the tube 45 or from the flask 43 will pass through the stand pipe 49 and may be reduced by a commercial catalyst to water, thus eliminating the possibility of hydrogen explosion.

From the foregoing, it will be apparent that the underwater wet cell battery case of present invention provides an economical and convenient means enabling a diver to utilize a relatively inexpensive wet cell battery in driving underwater electric devices without the necessity of having a relatively bulky battery mounted in the device itself and hindering maneuvering thereof.

I claim:

1. An underwater wet cell battery case for housing a battery to drive an underwater electrical device and comprising:
   a housing formed with a body defining a battery-receiving cavity and including a cover;
   attachment means for attaching said cover to said body;
   water tight sealing means for sealing between said cover and body;
   a mounting bracket formed with belt loop means;
   swivel means secured to said housing at a point above the center of gravity of the combined battery and housing and pivotally attaching said housing to said bracket for free pivoting of said housing relative to said bracket;
   electrical leads for attachment on their respective one ends with the terminals of said battery and on their respective opposite ends with the underwater electrical device.

2. An underwater wet cell battery case as set forth in claim 1 for use with a wet cell battery having an acid spill tube projecting therefrom and including:
   an acid flask mounted on the interior of said case and including an opening for receipt of said tube.

3. An underwater wet cell battery case as set forth in claim 1 wherein:
   said case includes a threaded bore and an annular seal including external threads for engagement with said threaded bore and interior seal means for sealing with said leads.

4. An underwater wet cell battery case as set forth in claim 1 wherein said case includes:
   a handle for grasping by hand so said case may be carried independent of said belt.

5. An underwater wet cell battery case as set forth in claim 1 wherein:
   said case is open on one side;
   said lid includes plug means closely fitting the open side of said case for supporting the side walls of said case against buckling inwardly under the pressure developed at deep water levels.

6. An underwater wet cell battery case as set forth in claim 1 wherein:
   said case includes hook means for mounting portable devices thereon.

* * * * *